P. L. MARDIS.
CONTROL APPARATUS.
APPLICATION FILED AUG. 10, 1916. RENEWED AUG. 3, 1918.
1,343,219.  
Patented June 15, 1920.  
2 SHEETS—SHEET 1.
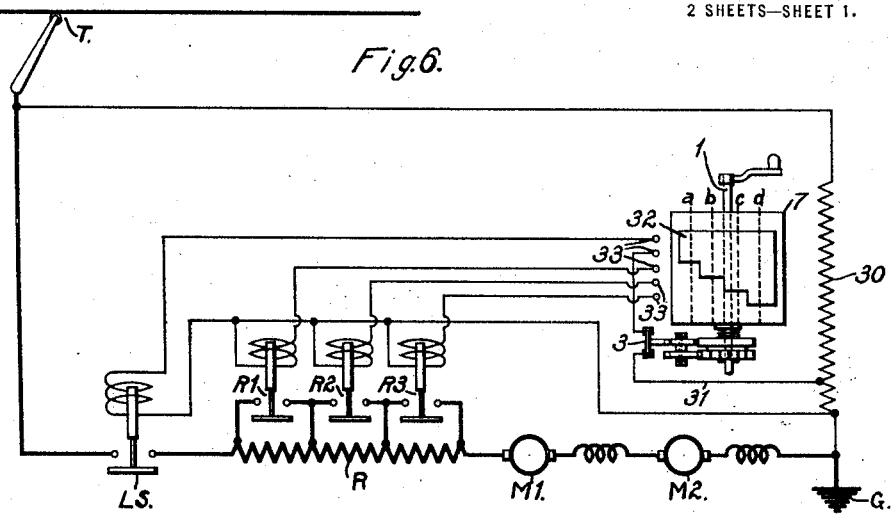
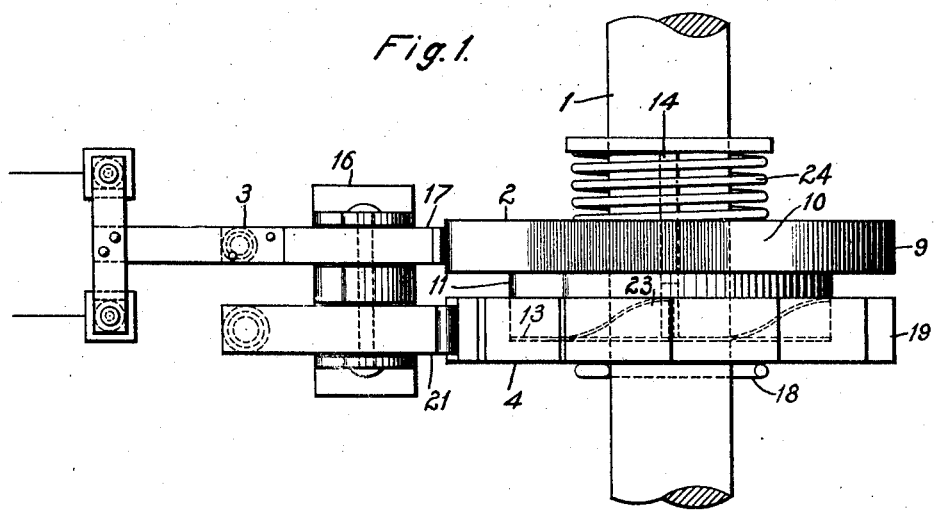
WITNESSES:
R. J. Fitzgerald
W. C. McCoy.
INVENTOR
Paul L. Mardis.
BY
Wesley G. Carr
ATTORNEY

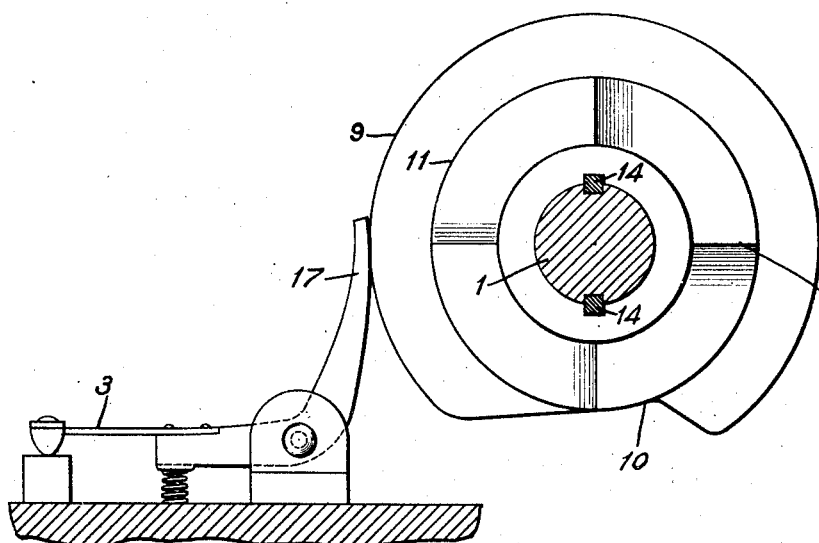
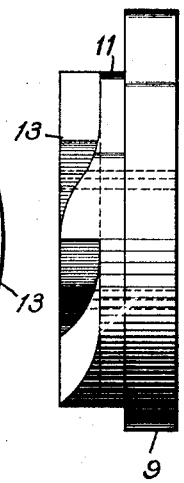
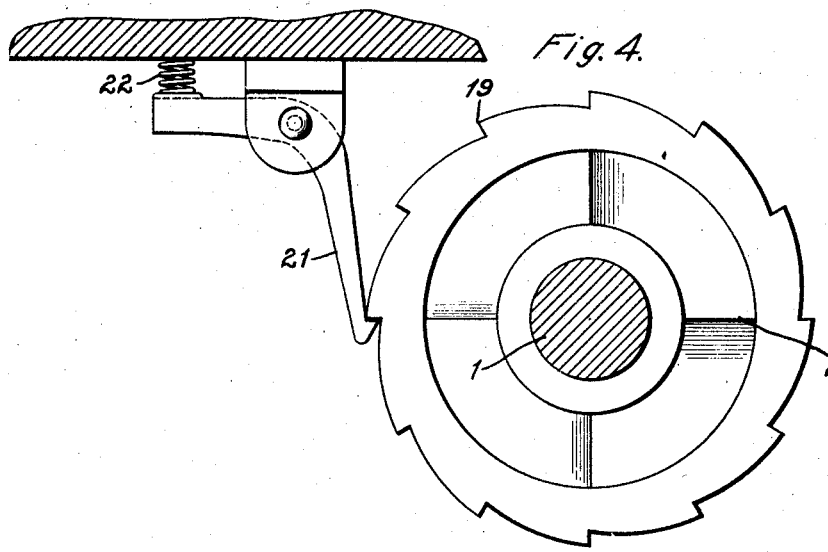
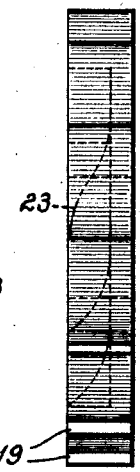

UNITED STATES PATENT OFFICE.

PAUL L. MARDIS, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL APPARATUS.

1,343,219.   Specification of Letters Patent.   Patented June 15, 1920.

Application filed August 10, 1916, Serial No. 114,163. Renewed August 3, 1918. Serial No. 248,227.

*To all whom it may concern:*

Be it known that I, PAUL L. MARDIS, a citizen of the United States, and a resident of Wilkinsburg, in the county of Allegheny and State of Pennsylvania, have invented a new and useful Improvement in Control Apparatus, of which the following is a specification.

My invention relates to control apparatus for governing the operation of electric motors and particularly to controllers employing an auxiliary switch that is maintained in one position for forward operation of the controller and is actuated to a different position for a relatively small degree of backward movement of the controller from any operating position.

One object of my invention is to provide a cam-operated switch for controllers of the above-indicated class that may be easily incorporated in the controller structure and be effective and reliable in operation.

A further object of my invention is to provide a switch which will not be returned to the normal forwardly-operative position unless the controller drum be returned to the "off" position.

Heretofore, controllers of this general type have been proposed in which the frictional engagement of suitable slip rings with the main controller drum served to actuate the switch. Such action is dependent upon the spring pressure and the condition of the engaging surfaces, thus making the operation fundamentally uncertain.

My invention provides an auxiliary switch which is entirely cam-operated and, therefore, mechanically certain in its movement.

Figure 1 of the accompanying drawings is a side elevational view of a portion of a controller embodying my invention; Fig. 2 is a bottom plan view of the switch-actuating cam shown in Fig. 1; Fig. 3 is a side elevational view of the cam shown in Fig. 2; Fig. 4 is a top plan view of the ratchet wheel shown in Fig. 1; Fig. 5 is a side elevational view of the ratchet wheel shown in Fig. 4, and Fig. 6 shows an application of a controller embodying my invention.

The apparatus shown in the drawings comprises a controller shaft 1 on which is mounted a cam 2 that is adapted to actuate a switch 3. A ratchet wheel 4 is provided to definitely open the switch 3 upon backward movement of the controller. The shaft 1 has a contact-bearing drum 7 mounted thereon that is adapted to assume a plurality of operating positions $a$, $b$, $c$ and $d$. The cam wheel 2 has a main cam surface 9 that is provided with a depression 10 corresponding to the "off" position of the controller and an auxiliary bearing surface 11 that is cylindrical in form and of the same radius as the cylindrically curved portion of the depression 10. The cylindrical portion of the cam wheel is provided with a plurality of lateral ratchet teeth 13. The cam wheel is adapted to slide upon the shaft 1 but is prevented from rotative movement thereon by keys 14. The switch 3 is pivotally mounted on a support 16 and is provided with a cam-engaging arm 17 that coöperates with the contact surface 9 during forward movement of the controller and with the surface 11 during backward movement thereof, as hereinafter fully set forth. The ratchet wheel 4 is rotatably mounted upon the shaft 1 and is held in position by a suitable collar 18. A pawl 21 is held in engagement with the periphery of the ratchet wheel 4 by a spring 22 and thereby restricts movement of the ratchet wheel to a forward direction. The wheel 4 has depressed lateral ratchet teeth 23 that are forced into engagement with the ratchet teeth 13 of the cam wheel 2 by a spring 24.

Referring to Fig. 6 of the drawings, electrical energy is delivered to a plurality of electric motors M1 and M2 from supply conductors T and G, through a line switch LS, a resistor R and a plurality of resistance-controlling switches R1, R2 and R3. The switches LS, R1, R2 and R3 are actuated by the movement of a controller drum 7 that is adapted to establish circuits for energizing the respective switch-operating magnets from a resistor 30, through a conductor 31 and the switch 3 to a conducting segment 32 of the controller drum. The controller is provided with a plurality of stationary contact fingers 33, which are adapted to be bridged by the segment 32 for the various operative positions of the controller drum.

If the control apparatus be assumed to occupy the positions shown in Fig. 6 of the drawings, the motors M1 and M2 may be started into operation by moving the controller drum 7 to position $a$, at which point a circuit is established from the resistor tap 31, through switch 3, conducting segment 32 and the energizing coil of line switch LS to the return-circuit conductor G. This causes the line switch LS to close and thereby complete a circuit from the trolley conductor T through the line switch LS, the resistor R and the operating motors to the return-circuit conductor G. If the controller drum is moved successively into positions $b$, $c$ and $d$, additional circuits will be established through the energizing coils of the switches R1, R2 and R3 for the respective positions of the controller drum to thereby short-circuit successive portions of the resistor R.

If the controller be moved backwardly a relatively small degree from any operative position, the pawl 21 will engage one of the teeth 19 of the ratchet wheel 4 and thereby prevent further rotative movement of the wheel. Since the cam wheel 2 is engaged by the keys 14, it will turn with the controller shaft and will cause the ratchet teeth 13 to slide upwardly upon the ratchet teeth 23 to disengage the switch arm 17 from the cam surface 9 and drop the same into engagement with the surface 11. After the arm 17 has engaged the surface 11, the projection of the upper portion of the cam wheel 2 prevents the subsequent return of the arm 17 to its normal position and thereby maintains the switch 3 in an open position until the controller is again turned to the "off" position. Inasmuch as the surface 11 and the cylindrically curved portion of the depression 10 have the same radius, the cam wheel 2 will be returned to its normal operative position by the spring 24 when the drum 7 reaches its "off" position.

It will be noted that the operation of such a controller as I propose will be independent of the condition of bearing surfaces and spring pressures and will, therefore, require but little attention and adjustment. The simplicity of the various parts embodied in the switch insures a structure that may be manufactured at comparatively small cost. Since the switch can not be closed, after an attempted backward movement, until the controller drum is again returned to the "off" position, damage to the motors resulting from a forward movement before the controller reaches the "off" position is avoided and the interlocking mechanisms heretofore employed in connection with auxiliary switches of this nature are rendered unnecessary.

Although I have described my invention in a simple and preferred form, it is not necessarily so limited, since various modifications thereof may be effected without departing from the spirit and scope of my invention as set forth in the appended claims.

I claim as my invention:

1. The combination with a shaft, of a cam slidably mounted on said shaft and actuated thereby, the cam surface having a depressed portion and a cylindrical surface having the same radius as said depressed portion, a pivotally-mounted switch having an arm for engaging said cam surface, and means for causing said switch arm to engage said cylindrical surface for a reverse direction of rotation.

2. The combination with a shaft, of a cam wheel slidably mounted upon said shaft and adapted to be operated thereby, said cam wheel having a cylindrical bearing surface of the same radius as a portion of the cam surface, a pivotally-mounted switch having an outwardly-extending arm adapted to bear upon said cam surface, and means for maintaining said switch arm on said cam surface during forward operation of said shaft and for causing said arm to make contact with said cylindrical surface for backward movement of said shaft.

3. The combination with a shaft, of a cam wheel slidably mounted on the shaft and adapted to be turned thereby, said cam wheel having a cylindrical bearing surface of the same radius as the least radius of the cam surface and having lateral ratchet teeth, a switch adapted to be actuated by said cam wheel, a ratchet wheel rotatably mounted upon said shaft and provided with a plurality of peripheral ratchet teeth and lateral ratchet teeth adapted to engage said cam wheel teeth, a pawl biased to engage said peripheral teeth, and means for yieldingly holding said cam-wheel teeth in engagement with said ratchet wheel.

4. The combination with a shaft, a cam wheel slidably mounted on said shaft and actuated thereby, a ratchet wheel rotatably mounted on said shaft and adapted to be turned in one direction only by said cam wheel, means for preventing the movement of said ratchet wheel in the other direction and for causing the separation of said wheels when said cam wheel is moved in the other direction, and a switch adapted to be actuated by said movement of said cam wheel.

5. The combination with a shaft, of a cam wheel actuated by the shaft and slidably mounted thereon, said cam wheel having a main bearing surface and an auxiliary bearing surface, a switch arm adapted to engage said main bearing surface during forward movement of the shaft and to engage said auxiliary surface during backward movement of said shaft.

6. The combination with a shaft, of a cam wheel having an offset cylindrical bearing surface of the same radius as the least radius of the cam surface, said cam wheel being slidably mounted upon said shaft and actuated thereby, an arm yieldingly held in engagement with said cam surface, a ratchet wheel rotatably mounted on said shaft and having ratchet engagement with said cam wheel, and a spring for yieldingly holding said cam wheel in engagement with said ratchet wheel.

7. The combination with a shaft, of a cam wheel slidably mounted upon the shaft and adapted to be turned thereby, said cam wheel having an offset cylindrical bearing surface of the same radius as the least radius of the cam surface, a switch adapted to be actuated by said cam wheel, a ratchet wheel rotatably mounted on the shaft and having ratchet engagement with said cam wheel, and a spring for yieldingly holding the said cam wheel in engagement with said ratchet wheel.

8. The combination with a shaft, of a cam wheel slidably mounted upon said shaft and adapted to be actuated thereby, a switch adapted to be actuated by said cam wheel, means adapted to engage said cam wheel when turned in one direction relative thereto and to become disengaged therefrom when turned in the opposite direction, and means for restricting the movement of said first means to one direction of rotation.

9. The combination with a shaft, and a contact-carrying drum, of a cam rotatable with said shaft, an operating handle for the shaft, a pivotally mounted switch having an arm held in yielding engagement with said cam during the forward movement of said drum by said handle operating in a given plane, and means for holding said arm out of engagement with said cam during backward movement of said drum by said handle operating in the same plane.

10. The combination with a shaft, of a cam wheel slidably mounted upon said shaft and adapted to be operated thereby, said cam wheel having a cylindrical bearing surface of the same radius as a portion of the cam surface, a switch having an actuating arm yieldingly held in engagement with said cam wheel, and means for maintaining said arm in engagement with said cam surface during continuous forward movement of said shaft and for maintaining said arm in contact with said cylindrical surface after a slight degree of backward movement of said shaft.

11. The combination with a shaft, of a cam actuated by the shaft and slidably mounted thereon and having a pair of discontinuous bearing surfaces, and a switch arm adapted to engage one or the other of said bearing surfaces in accordance with the position of said cam upon said shaft.

12. The combination with a rotatable member, of a ratchet member secured thereto, a pair of contact members, and a cam member having a tooth engaged by a tooth of said ratchet member in one direction of rotation thereof to effect the closure of said contact members.

13. The combination with a movable contact member and a plane cam rotatable in one direction to actuate said contact member, of means dependent upon the rotative movement of the cam for moving said cam out of its plane when said cam is rotated in the opposite direction.

14. The combination with a pair of members movable as a unit in one direction and movable relatively to each other in another direction, of a switch member adapted to be moved to closed position by one of said movable members when said movable members move as a unit and adapted to be moved to open position when said movable members move relatively to each other.

15. The combination with a movable contact member, of an actuating member therefor, a shaft for rotating said actuating member, said actuating member being slidably mounted upon said shaft and having an inclined tooth, a ratchet member loosely mounted upon said shaft and having an inclined tooth, means for biasing said actuating member toward said ratchet member, said teeth then causing said ratchet member and said actuating member to rotate together in one direction to actuate said contact member, and a pawl for engaging said ratchet member to prevent the rotation of said ratchet member in the opposite direction, said teeth then causing said actuating member to slide along said shaft out of operative relation to said contact member.

16. In a controller, the combination with a switch member and an actuating member having a normal plane of movement for actuating said switch member, of biasing means for shifting said actuating member into said plane, said actuating member being dependent upon rotative movement of the controller for shifting out of said plane.

17. In a controller, the combination with a switch member and a cam member for actuating said switch member, of means comprising a manually operable member for rotatively shifting the cam member out of the plane of said switch member, and automatic means for actuating said cam member into said plane.

In testimony whereof, I have hereunto subscribed my name this 25th day of July 1916.

PAUL L. MARDIS.